United States Patent [19]
Smith et al.

[11] Patent Number: 5,924,023
[45] Date of Patent: Jul. 13, 1999

[54] CHANNEL OPERATION MONITORING IN CELLULAR COMMUNICATIONS NETWORKS

[75] Inventors: Anthony John Smith, Sutton; Peter James Myers, Letchworth, both of United Kingdom

[73] Assignees: Anthony J. Smith, Bedfordshire; Peter J. Meyers, Hertfordshire, both of United Kingdom

[21] Appl. No.: 08/770,481

[22] Filed: Dec. 20, 1996

[30] Foreign Application Priority Data

Dec. 17, 1996 [GB] United Kingdom ............. 9526250

[51] Int. Cl.⁶ ....................................... H04B 17/00
[52] U.S. Cl. ............................. 455/226.3; 455/226.2; 455/450; 455/67.3
[58] Field of Search .................. 455/67.1, 63, 67.3, 455/501, 115, 226.1, 226.2, 226.3, 226.4, 62, 296, 446, 450, 455, 509, 516, 422

[56] References Cited

U.S. PATENT DOCUMENTS

| | | | |
|---|---|---|---|
| 5,161,248 | 11/1992 | Bertiger et al. | 455/428 |
| 5,450,623 | 9/1995 | Yokoyama et al. | 455/226.3 |
| 5,471,670 | 11/1995 | Hess et al. | 455/161.3 |

*Primary Examiner*—Doris H. To
*Attorney, Agent, or Firm*—Wilson, Sonsini, Goodrich & Rosati

[57] ABSTRACT

In order to test the performance of a mobile communications channel, the occurrences of active signals and interference signals are analyzed to determine a percentage interference figure for each channel, which can be used in radio planning.

8 Claims, 6 Drawing Sheets

CHANNEL OPERATION MONITORING IN CELLULAR COMMUNICATIONS NETWORKS

BACKGROUND OF THE INVENTION

1. Field of the Invention

The present invention relates to the monitoring of the operation of channels in cellular communications networks.

2. Description of the Related Art

The general layout of cellular communications networks is well known and will not be described in detail herein. Briefly, a network comprises a number of geographical areas or "cells" each provided with a base station (otherwise known as a "cell site") from which signals are sent to and received from transceivers (e.g. telephones) within the cell. The area of a cell is not strictly defined. The base station from which a particular telephone receives signals at any time will depend not only on the geographical location of the telephone but also other factors such as relative signal strengths between adjacent base stations.

A cellular network operator is allocated a number of frequency bands or channels on which it is permitted to send and receive signals. Each base station of the network operates on a selected group of the total number of permitted channels. Some base stations transmit and receive signals omnidirectionally. Others are subdivided into sectors which operate on a subgroup of the channels selected for the base station.

When a network is set up or a new base station is added to an existing network, channels must be allocated to cells or base stations in a manner which minimizes the probability of interference between simultaneous communications at the same frequency or adjacent frequencies. This is the task of a radio planner. For example, it might be assumed that a cell in Scotland could safely operate on the same channel as a cell in Cornwall since the distance between these locations would make interference unlikely. All kinds of geographical features contribute to the likelihood of interference including mountains and tall buildings. Rivers for example exhibit low attenuation of radio signals at cellular frequencies.

The radio plan is necessarily somewhat theoretical and is compiled mainly on the basis of "downlink" information, i.e. outgoing signals from the base station. Once a network or a new base station goes "live", two-way communications increase the probability of interference, mainly due to unforeseen to "uplink" problems. Such problems increase the probability of "dropped calls" on the network and reduce the overall performance of the network. The expression "dropped calls" is used to refer to telephone calls which are cutoff, from the user's point of view, when communication is lost and cannot be re-established within a reasonable period of time.

The occurrence of dropped calls and poor quality calls is probably the biggest disadvantage of mobile telephones versus "stationary" or "wired" telephones from the user's point of view and if one network operator could guarantee a lower dropped call rate and better quality calls than another, this would be attractive to mobile telephone users.

Interference which can ultimately result in dropped calls is mainly due to other telephones in operation although additional sources of interference include other electrical equipment, which sometimes goes "off tune" and interferes with mobile communications.

In order to distinguish between the active or wanted signal and an interference signal from another telephone in communication with another base station, all analogue cellular radio signals are superimposed with a SAT tone which acts as a signal identifier. A receiving base station will distinguish between the "wanted" signal and the interference signal by the SAT tone. The likelihood of two signals arriving at a base station on the same channel as well as having the same SAT tone is small.

Base stations are provided with equipment for monitoring incoming calls and interference and reporting problems on particular channels. If one particular channel is subject to an unduly high level of interference, it is "blocked out" and not reused until the level of interference has subsided. The base station equipment is able to provide a "block out" report which indicates the lack of availability of any particular channel due to excessive interference. If a particular channel is continuously blocked out it might be taken out of service altogether. The block out report would typically state the amount of time for which the channel was unavailable and the highest and lowest levels of interference during the block out period. The SAT tones associated with the interference might also be recorded. Since a channel cannot be blocked out during a call, the block out report does not identify dropped calls since these occur when a channel becomes susceptible to large interference after a call has been "connected". Thus, a block out report is an incomplete picture of the operation of any particular channel.

Network operators accept that a certain percentage of dropped calls are inevitable in any mobile communications network and manage the allocation of channels, at best, on the limited information available from a block our report, otherwise known as a "foreign carrier" report. The present invention is based on the realization that the performance of any channel in a communications network can be more accurately predicted on the basis of a statistical analysis of the signals occurring on the channel.

SUMMARY OF THE INVENTION

The present invention provides a method of testing the performance of a channel in a communications network comprising:

(a) monitoring the occurrence of interference signals received on the channel as a function of signal strength;

(b) monitoring the occurrence of active signals received on the channel as a function of signal strength; and (c) using the results of steps (a) and (b) to calculate the proportion of time for which the ratio of active signal strength to interference signal strength will drop below a predetermined level.

The calculation in step (c) is a matter of straightforward statistical analysis and will not be described in detail herein. In the simplest example of the invention, step (c) can be used to determine the percentage of time for which the interference signal strength exceeds the active signal strength.

Once a test method according to the invention has been carried out, the network operator can manage the network in a positive way. The percentage of time for which the inference signal strength exceeds the active signal strength (hereinafter percentage inference) bears a direct relationship to the percentage of dropped calls or poor quality calls. Having a percentage interference figure for each channel in use on the network, a network operator can decide what percentage interference is acceptable and take action in relation to those channels for which the level of interference is unacceptable. The channel could either be reallocated or the signal strength on that channel could be boosted. (The latter action might have the result of increasing interference on other channels.)

It should be noted here that there is a trade-off between the acceptable level of dropped call rates and the capacity of the network as a whole. (Capacity can be defined in various ways such as the number of simultaneous users which can be accommodated on the network or the number of calls, in terms of time, which the network can carry in one week.) Generally speaking, reducing the acceptable level of dropped calls reduces the capacity of the network. The test method of the present invention enables the network operator to manage this in a positive way.

Since interference is generally present on a channel to a greater or lesser degree all of the time, step (a) above is carried out during periods when no active signals are being received on the channel, or preferably when the base station is inactive. Step (b) can be carried out when the base channel is active. Interference will be present at this time but it will usually be at a lower level and in any case it can be ignored for the purpose of signal strength monitoring.

The present invention may be used to predict the likely incidence of interference on "inactive" channels. It is reasonable to assume that the average active signal strength is likely to be the same for all available channels at a particular sector at a particular base station. For any channel, active or inactive, the level of interference can be measured during periods when no active signals are received on the channel. As a result, the percentage interference or, more generally, the likely incidence of interference, of an inactive channel may be determined from the signal strengths on a channel which is active at the base station and the interference on the inactive channel.

Thus another aspect of the invention provides a method of predicting the performance of an inactive channel at a base station in a communications network comprising the steps of:

(d) monitoring the occurrence of interference signals received on the channel as a function of signal strength;

(e) monitoring the occurrence of active signals received on another channel at the same base station as a function of signal strength; and (f) using the results of steps (d) and (e) to determine the proportion of time for which the ratio of active signal strength to interference signal strength for the inactive channel will drop below a predetermined level.

Preferably, in step (e), instead of monitoring active signals on one active channel the occurrence of active signals received on all active channels in a particular sector at the base station is monitored over a period of time and averaged to provide an "assumed" active signal strength distribution for the inactive channels.

The methods of the invention are suitable for use in digital as well as analogue cellular communications systems.

BRIEF DESCRIPTION OF THE FIGURES

Embodiments of the invention will now be described by way of example only and with reference to the accompanying drawings in which.

DETAILED DESCRIPTION

In order to carry out the methods of the invention, a base station needs to be provided with a radio receiver having signal strength measuring capabilities. Most base stations are provided with such equipment for other purposes.

Figure 1:
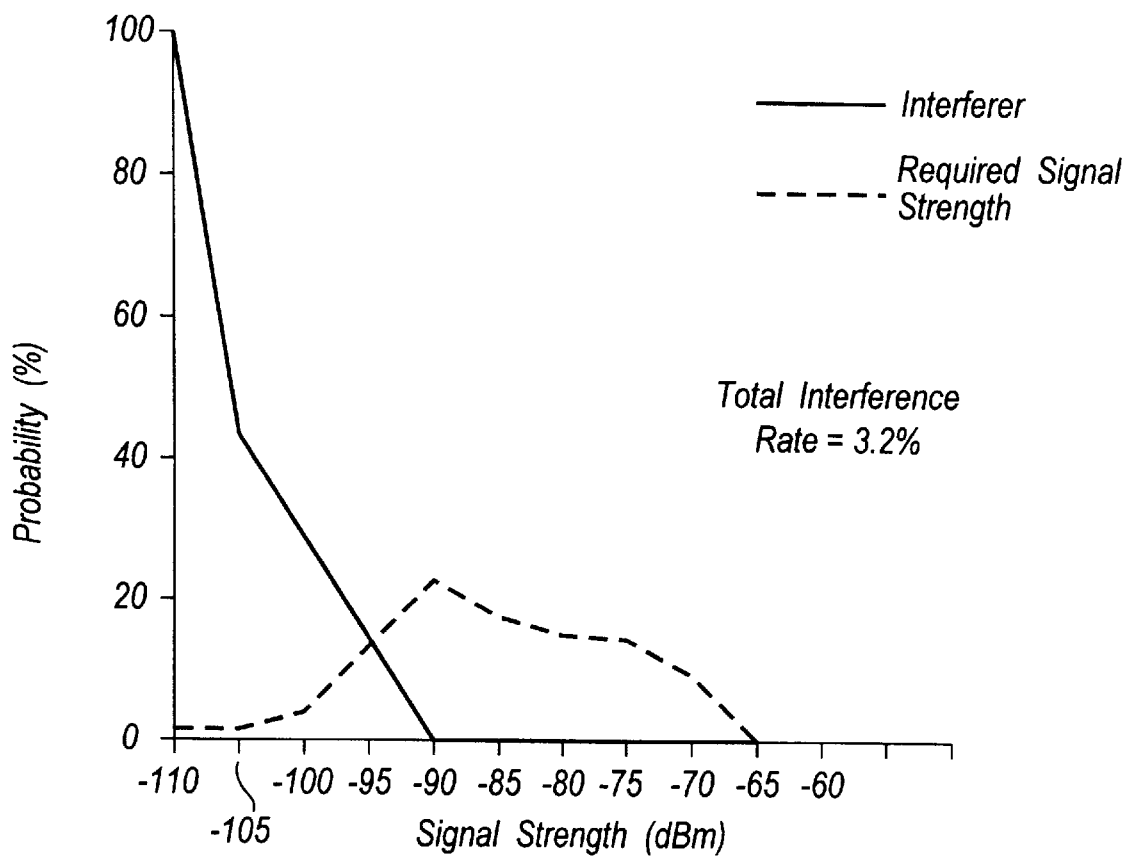
FIG. 1 is a graph of signal strength versus probability (in terms of time) showing both interference and active signals for one particular channel in a communications network.

Referring now to the drawings, FIG. 1 is a graph showing the occurrence of interference and "active" or "wanted" signals on a particular channel plotted as a function of signal strength. It will be noted that the interference increases exponentially with decreasing signal strength towards what is generally referred to as the "noise floor" at about −120 dBm. The vertical axis in the graph is indicated as "probability" since the accumulated real time data is an indication of probability of active signals and noise occurring in future. Thus, there is virtually 100% probability that very low signal strength noise will be present as background noise to any active signal. The active signal strength peaks at about −90 dBm in the graph shown. The data shown in FIG. 1 is accumulated over a relatively short period of time, (i.e. 1 day). The more data that is accumulated, the more the graph of active signal strength approaches a smooth distribution curve centered on −90 dBm.

Having determined the distribution of active and interference signals, it is then possible to use standard statistical analysis techniques to calculate a total interference rate, i.e. the percentage of time for which the strength of the interference signal exceeds the strength of the active signal. For the case illustrated in FIG. 1, the interference rate is calculated at 1.4%. Further statistical analysis, not described in detail herein, will enable this figure to be directly related to a dropped or poor quality call rate.

Figure 2:
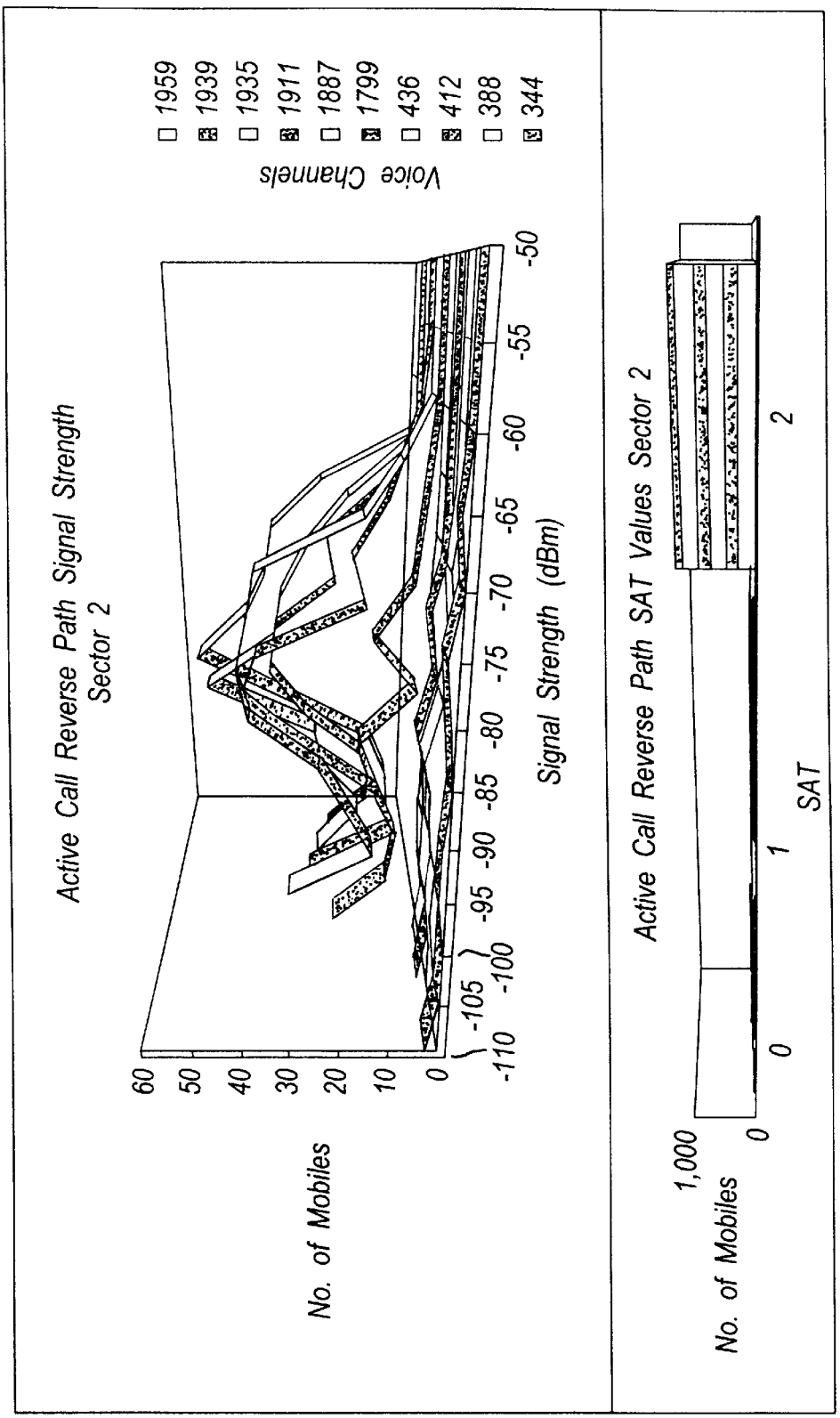
FIG. 2 is a graph similar to FIG. 1 presented in three dimensions to show additional channels and showing active signals only.

FIG. 2 is a three dimensional graph illustrating how the data of FIG. 1 may be represented for a number of different channels. Only the active signal strength is illustrated in FIG. 1. It is referred as "active call reverse path signal strength" because it is based on incoming signals only. Individual channels are represented by ribbons which may be color coded.

Figure 3:
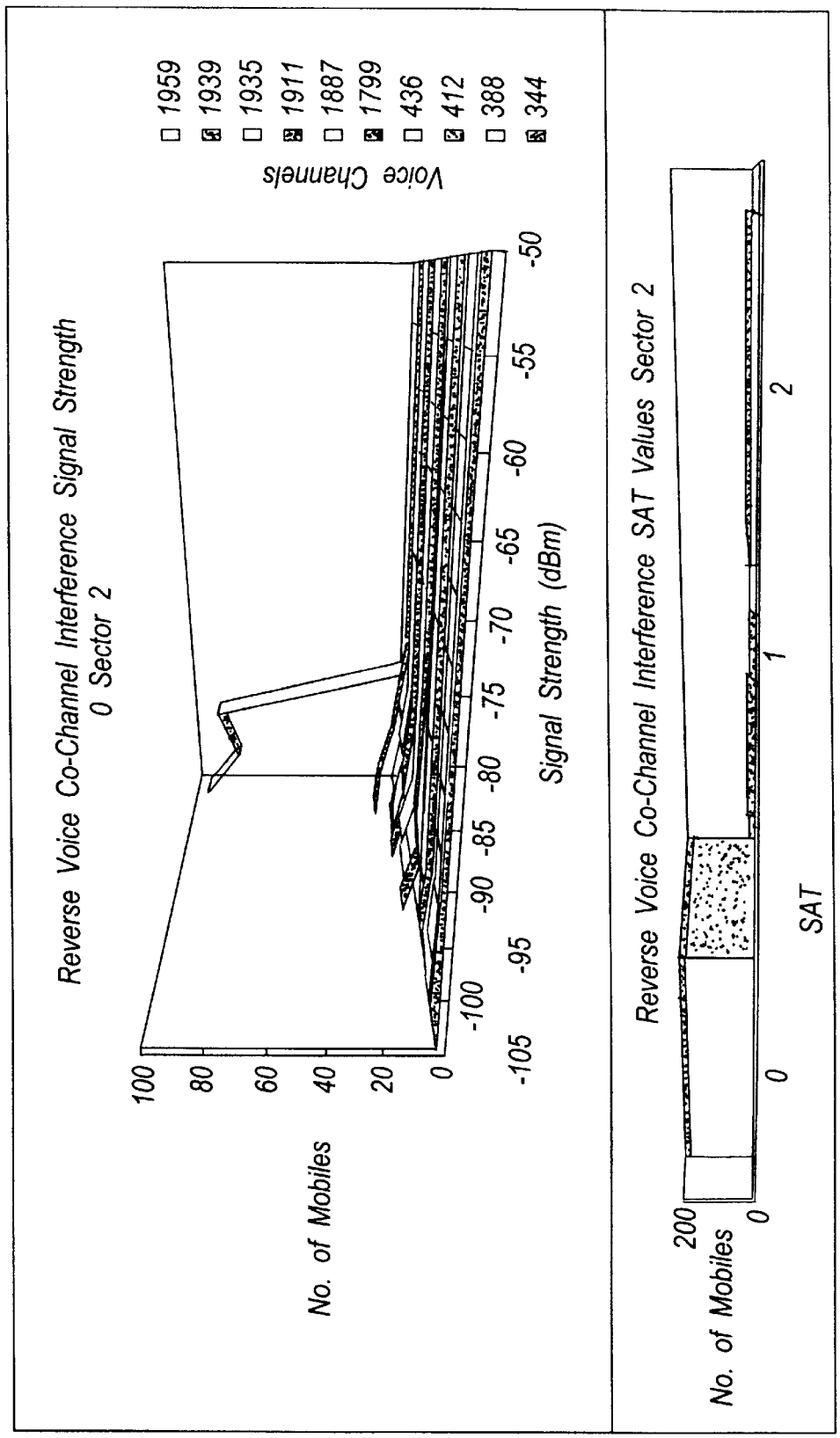
FIG. 3 is a graph similar to FIG. 2 showing interference signal strength only.

FIG. 3 shows a graph similar to FIG. 2 showing interference data only. Again, individual channels are represented by ribbons which may be color coded.

Figure 4:
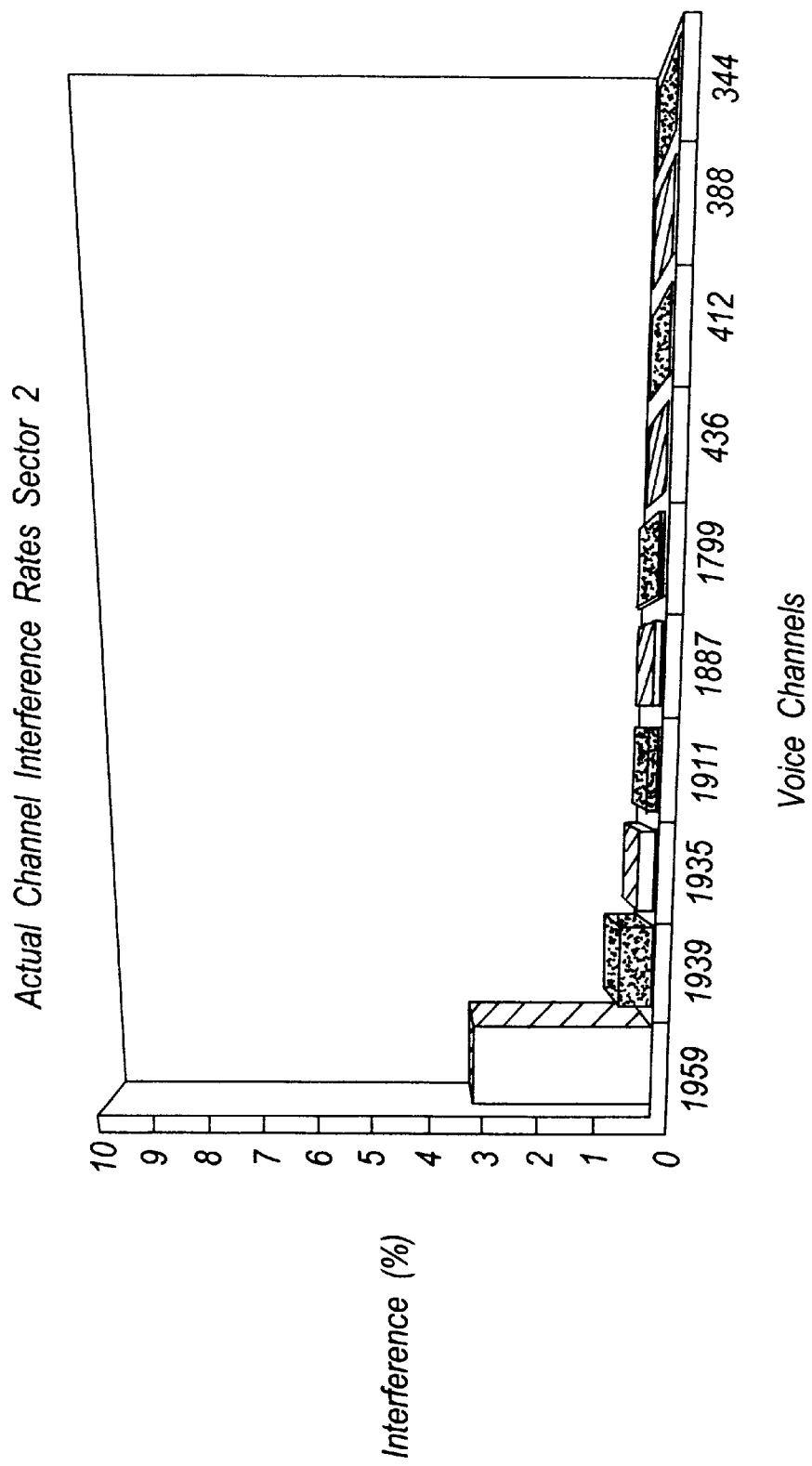
FIG. 4 is a block diagram showing the calculated percentage interference for a number of voice channels.

FIG. 4 is a bar chart showing percentage interference values for different voice channels. The graph of FIG. 4 enables the interference values for different channels to be compared and channels with particular problems can be readily identified.

Figure 5:
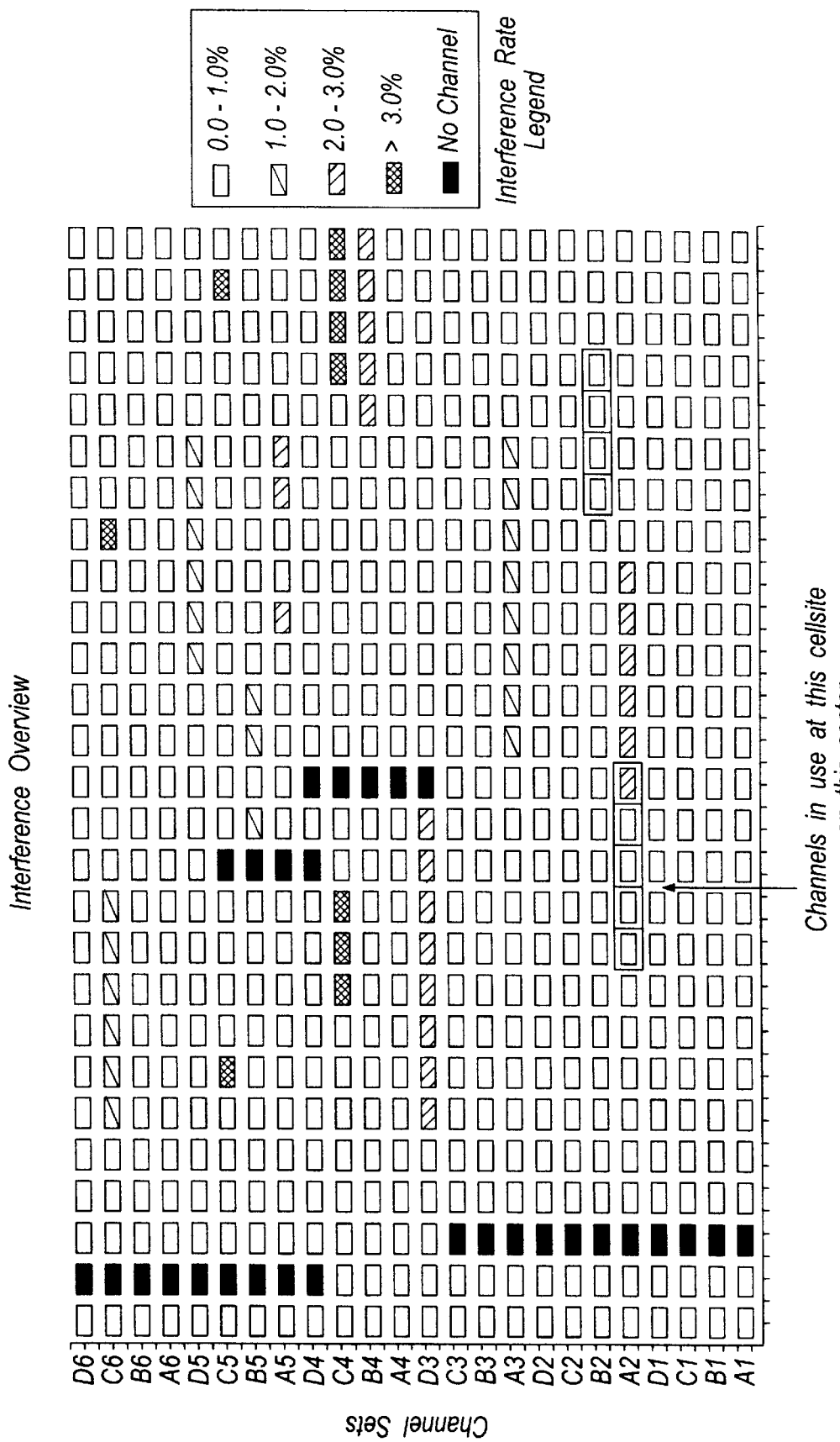
FIG. 5 is a chart indicating the predicted percentage interference for all available channels at one base stations on one sector.

The graphs of FIG. 2 can be summed and averaged and the resulting distribution is a reasonable approximation of the likely active signal strength distribution on any channel operating from the same base station. Thus, the likely performance of inactive channels at a particular base station may be determined from the actual performance of the active channels. FIG. 5 charts the likely performance of 24×27 channels at a base station, by way of example. Other channel groupings could be displayed in a different matrix array.

Each channel is represented by a square of color in a 24×27 matrix display. The matrix rows define what are known as "channel sets". The grouping of channels into particular sets is convenient for radio planning.

All of the channels are preferably color coded according to likely or actual performance, with a range of colors for performance bands ranging from very good to very bad, in terms of occurrence of interference, determined as described above. Active channels may be indicated differently to distinguish them from the inactive channels.

As noted above, in order to carry out the methods of the invention, a base station needs to be provided with radio receiving equipment having signal strength measurement capabilities. One example of suitable equipment is illustrated schematically in FIG. 6.

The base station will have one or more antennas 10 for receiving incoming signals. Signals from antennas 10 are routed to an r.f. switch 11 which can be used to select one aerial whose signals are to be passed to a radio receiver 12. The r.f switch 11 is controlled by a microprocessor 13. The radio receiver 12, also controlled by microprocessor 13, decodes incoming signals, and the strength of the signals is measured by power measurement equipment 14. Power measurement values are stored in memory 15 under the control of microprocessor 13.

The microprocessor 13 has a communications port 16 which enables the information stored in memory 15 to be accessed by remote equipment, such as a computer, which analyzes the information according to the methods of the invention. Communications port 15 will typically include a modem so that the data in memory 15 can be accessed via the telephone network. Thus, the methods of the invention may if desired be carried out by third parties providing a performance monitoring service, rather than the network operators.

Also connected to r.f. switch 11 is the base station outgoing signal antenna 20. This can be used to monitor the activity on channels at the base station and to differentiate interference signals from active signals. A telephone conversation will have two pre-allocated frequencies one for each transmission direction, such that two parties to a call can speak at the same time. It is possible to determine which "outgoing" channels at a base station are active, by tapping off signals from the antenna 20. From this determination, it is then possible to determine whether or not signals received on "incoming" channels are interference signals.

Figure 6:
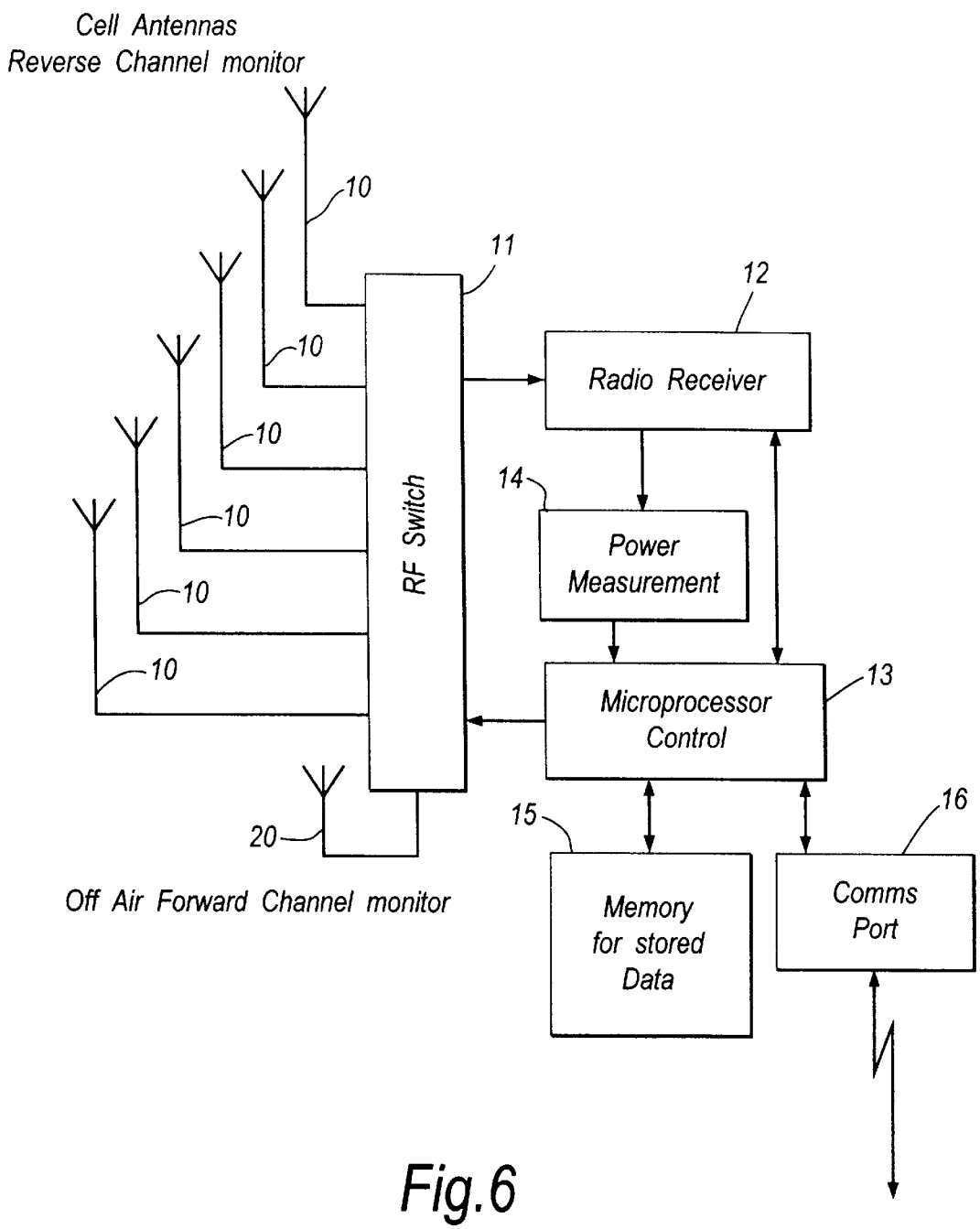
FIG. 6 is a schematic diagram of suitable base station equipment for carrying out the invention.

It will be appreciated that the base station equipment needed to implement the invention could take other forms than that shown in FIG. 6, provided that the base station equipment has the facility to measure signals strengths on respective channels.

What is claimed is:

1. A method of operating a communications network comprising a plurality of base stations to which communications channels are allocated, the method including testing the performance of a channel by the steps of:
   a. monitoring the distribution of interference signals received on the channel as a function of signal strength during periods when no active signals are being received on the channel;
   b. monitoring the distribution of active signals received on the channel as a function of signal strength; and
   c. using the results of steps (a) and (b) to calculate the proportion of time for which the ratio of active signal strength to interference signal strength will drop below a predetermined level.

2. A method as claimed in claim 1 in which step (c) is used to determine the percentage of time for which the interference signal strength exceeds the active signal strength.

3. A method as claimed in claim 1 or 2 in which step (b) is carried out when the channel is active.

4. A method as claimed in claim 1, in which step (c) is used to determine the percentage of time for which the interference signal strength exceeds the active signal strength; and in which step (b) is carried out when the channel is active; and in which step (a) is carried out when the base station is inactive.

5. The method as claimed in claim 1, in which step (b) is carried out when the channel is active; and in which step (c) is used to determine the percentage of time for which the interference signal strength exceeds the active signal strength.

6. The method as claimed in claim 1, further comprising the step of reallocating or boosting the signal strength of the channel in the event that the calculated proportion is unacceptable.

7. The method of predicting the performance of an inactive channel at a base station in a communications network comprising the steps of:
   (a) monitoring the occurrence of interference signals received on the channel as a function of signal strength;
   (b) monitoring the occurrence of active signals received on another channel at the same base station as a function of signal strength; and
   (c) using the results of steps (a) and (b) to determine the proportion of time for which the ratio of active signal strength to interference signal strength for the inactive channel will drop below a predetermined level.

8. The method as claimed in claim 7 in which step (b) comprises monitoring the occurrence of active signals received on all active channels in a sector of the base station and averaging the results to provide an "assumed" active signal strength distribution for the inactive channel.

* * * * *